United States Patent
Lang (10) Patent No.: US 9,419,494 B2
(45) Date of Patent: Aug. 16, 2016

(54) INDUCTION MACHINE POWER CONNECTION BOX INCLUDING POWER SUPPLY FOR AUXILIARY DEVICES INCLUDING AUXILIARY COOLING FANS

(75) Inventor: Nicholas G. Lang, Cincinnati, OH (US)

(73) Assignee: SIEMENS INDUSTRY, INC., Alpharetta, GA (US)

(*) Notice: Subject to any disclaimer, the term of this patent is extended or adjusted under 35 U.S.C. 154(b) by 666 days.

(21) Appl. No.: 13/105,064

(22) Filed: May 11, 2011

(65) Prior Publication Data

US 2012/0286600 A1  Nov. 15, 2012

(51) Int. Cl.
*H02K 5/22* (2006.01)
*H02K 11/00* (2016.01)
*H02K 9/04* (2006.01)

(52) U.S. Cl.
CPC .............. *H02K 5/22* (2013.01); *H02K 5/225* (2013.01); *H02K 11/0094* (2013.01); *H02K 11/33* (2016.01); *H02K 9/04* (2013.01)

(58) Field of Classification Search
CPC ... H02K 17/30; H02K 11/0094; H02K 5/225; H02K 16/00; H02K 9/04; H02K 5/22; H02K 11/0073; H02K 3/12; H02K 3/28; H02M 7/00; H02M 5/12; H02M 5/005; H02M 5/271; H02M 5/275; H02M 5/27; H02M 5/14; H02M 5/17; H02M 5/10; H02B 1/50; H01F 30/14; H03B 19/00; H02P 9/42
USPC ................................ 310/68 D, 68 R; 361/601
See application file for complete search history.

(56) References Cited

U.S. PATENT DOCUMENTS

| | | | | |
|---|---|---|---|---|
| 2,125,110 A | * | 7/1938 | Harty | 320/165 |
| 2,125,628 A | * | 8/1938 | Fredrickson | 335/284 |
| 2,148,136 A | * | 2/1939 | Samer | 361/43 |
| 2,196,138 A | * | 4/1940 | Bullard | 361/66 |
| 2,295,805 A | * | 9/1942 | Palmer | 361/65 |
| 2,295,916 A | * | 9/1942 | Schiff | 310/68 D |
| 2,546,736 A | * | 3/1951 | Fry et al. | 310/68 D |
| 2,638,555 A | * | 5/1953 | Marks | 310/11 |
| 2,752,529 A | * | 6/1956 | Croco et al. | 315/141 |
| 2,756,368 A | * | 7/1956 | Gross et al. | 361/601 |
| 2,874,317 A | * | 2/1959 | Couse | 310/71 |
| 2,957,118 A | * | 10/1960 | Steinert et al. | 363/100 |

(Continued)

OTHER PUBLICATIONS

T.A. Short, Electric Power Distribution Handbook, 2003, CRC Press, Ch. 1 ("Fundamentals of Distribution Systems").*

(Continued)

*Primary Examiner* — Burton Mullins (57) ABSTRACT

An alternating current (AC) induction machine, such as a medium voltage induction motor, includes an auxiliary electrical connection box that is incorporated in the terminal box or within separate auxiliary electrical connection boxes that, are coupled to the machine's incoming power source. The box includes power conversion transformers or bridges that respectively convert the incoming AC power to other AC voltages or direct current (DC) useful for operating auxiliary devices proximal the machine. The connection box avoids the need to run separate power lines to induction machines necessary for operating auxiliary devices. Exemplary auxiliary devices include external auxiliary AC powered cooling fans for medium voltage AC motors. The auxiliary connection box may reconfigurable in the field and/or be pre-configured to provide one or more common auxiliary device output power sources.

11 Claims, 5 Drawing Sheets

(56) References Cited

U.S. PATENT DOCUMENTS

| | | | |
|---|---|---|---|
| 3,060,336 A * | 10/1962 | Liimatainen et al. | 310/68 D |
| 3,142,013 A * | 7/1964 | McGrath et al. | 318/471 |
| 3,247,437 A * | 4/1966 | Meadows et al. | 318/467 |
| 3,273,020 A * | 9/1966 | Murphey | 361/627 |
| 3,496,420 A * | 2/1970 | Leonard et al. | 361/623 |
| 3,568,016 A * | 3/1971 | Barber | 318/78 |
| 3,621,339 A * | 11/1971 | Hodgson | 361/678 |
| 4,027,205 A * | 5/1977 | Frederick | 361/694 |
| 4,443,187 A * | 4/1984 | Shaftner et al. | 432/222 |
| 4,589,050 A * | 5/1986 | Cutler et al. | 361/86 |
| 4,754,179 A | 6/1988 | Capuano | |
| 4,780,659 A * | 10/1988 | Bansal et al. | 322/58 |
| 5,633,792 A * | 5/1997 | Massey | 363/109 |
| 5,822,164 A * | 10/1998 | Graf | 361/23 |
| 6,081,423 A * | 6/2000 | Griffin | 361/688 |
| 6,577,031 B2 * | 6/2003 | Morooka et al. | 310/68 R |
| 6,900,562 B2 * | 5/2005 | Derksen | 310/68 R |
| 7,365,294 B2 * | 4/2008 | Park | 219/761 |
| 7,471,002 B2 * | 12/2008 | Konishi | 290/31 |
| 7,560,831 B2 * | 7/2009 | Whitted et al. | 307/64 |
| 7,576,630 B2 * | 8/2009 | Darr | 337/72 |
| 7,855,630 B2 * | 12/2010 | Darr | 337/206 |
| 7,855,873 B2 * | 12/2010 | Darr et al. | 361/642 |
| 7,886,173 B2 * | 2/2011 | Krieger et al. | 713/330 |
| 8,089,335 B2 * | 1/2012 | Darr et al. | 337/206 |
| 8,120,929 B2 * | 2/2012 | Becherer et al. | 361/807 |
| 8,134,828 B2 * | 3/2012 | Creighton et al. | 361/644 |
| 8,310,333 B2 * | 11/2012 | Ventura et al. | 337/211 |
| 2004/0061992 A1 * | 4/2004 | Roman et al. | 361/601 |
| 2006/0126277 A1 * | 6/2006 | Tomkowiak | 361/601 |
| 2006/0163945 A1 * | 7/2006 | Bornhorst et al. | 307/1 |
| 2007/0252670 A1 * | 11/2007 | Darr | 337/143 |
| 2007/0278860 A1 * | 12/2007 | Krieger et al. | 307/64 |
| 2008/0179973 A1 | 7/2008 | Kreitzer | |
| 2009/0021078 A1 * | 1/2009 | Corhodzic et al. | 307/67 |
| 2010/0014273 A1 * | 1/2010 | Darr | 361/837 |
| 2011/0116212 A1 * | 5/2011 | Rosemore et al. | 361/623 |
| 2011/0292563 A1 * | 12/2011 | Head | 361/268 |
| 2012/0062211 A1 * | 3/2012 | Neal et al. | 324/127 |

OTHER PUBLICATIONS

P. Horowitz & W. Hill, The Art of Electronics, 1989, Cambridge University Press, 2d ed., § 1.17, pp. 28-29.*

PCT International Search Report mailed Jul. 10, 2013 corresponding to PCT International Application No. PCT/US2012/036307 filed May 3, 2012 (12 pages).

* cited by examiner

INDUCTION MACHINE POWER CONNECTION BOX INCLUDING POWER SUPPLY FOR AUXILIARY DEVICES INCLUDING AUXILIARY COOLING FANS

BACKGROUND OF THE DISCLOSURE

1. Field of the Invention

The invention relates to power connection boxes induction machines, such as medium voltage AC motors, and more particularly to terminal boxes or other auxiliary boxes capable of providing power for auxiliary devices that have operational electric power requirements differing from the motor. The terminal box has access to the induction machine incoming power and includes a power supply capable of converting the incoming power to power necessary for operation of one or more auxiliary devices, such as external electric cooling fans for medium voltage AC motors.

2. Description of the Prior Art

Induction machines, such as medium voltage AC powered electric motors, are often operated in conjunction with auxiliary devices, such as monitoring equipment, motor controls and external electric powered cooling fans that have different power requirements than the medium voltage motor. Some monitoring equipment may require 24 volt DC power. An external cooling fan may require of voltage AC power in the 110 to 220 volt range. In the past auxiliary devices required separate, parallel power sources than the medium voltage power source used to power the motor, or alternatively they could be mechanically driven by the motor shaft.

As a further example, commonly owned U.S. patent application Ser. No. 13/018,874, filed Feb. 1, 2011 is directed to an auxiliary cooling fan that is driven for by the AC motor's shaft, the entire contents of which is incorporated herein by reference. In other auxiliary cooling applications it may be preferable to drive the auxiliary fan in a manner that is not dependent upon the cooled motor's shaft speed, such as by an independently powered AC fan motor, as is shown in commonly owned U.S. Patent Publication No. 2008/0179973, the entire contents of which is also incorporated herein by reference. The independently powered AC fan motor will need its or power source, necessitating the routing of an auxiliary power line in addition to the medium voltage power lines used to power the larger motor.

Routing of one or more auxiliary power lines additional to the medium voltage power lines increases site installation complexity, as well as installation and future operational maintenance costs. For example, separate auxiliary and induction machine power lines often require separate junction boxes for connecting power to the devices powered by each line, increasing the quantity of electrical equipment that must be installed during initial system construction.

After construction, separate junction boxes for line and auxiliary power necessitate maintenance of multiple electrical connection access points for service personnel. Electrical maintenance practices often dictate that each connection access point be de-energized ("locked out") prior to servicing equipment. Minimizing the number of electrical connection access points is desirable for reducing maintenance complexity and time.

Minimizing electrical access points is also helpful for reducing equipment reconfiguration cost and effort. In the future if auxiliary device needs change, it is possible that more auxiliary power lines or other sources will have to be routed to the site, or existing lines may need to be modified to meet the new needs. It is desirable to have electrical distribution equipment that is easily reconfigurable to meet changing operational needs.

Thus, a need exists in the art for auxiliary device power sources proximal induction machines that do not necessitate routing of additional auxiliary power lines.

A need also exists in the art for auxiliary device power sources proximal induction machines that can be modified or otherwise reconfigured to meet changing future power needs without necessity to modify or supplement existing auxiliary power lines.

An additional need exists in the art for auxiliary device power sources proximal induction machines that are pre-configured to provide designated power outputs, for example 110 or 220 volt AC power or DC power (e.g., 12 or 24 VDC), as may be needed for various auxiliary devices.

SUMMARY OF THE INVENTION

Accordingly, an object of the invention is to provide auxiliary device power sources proximal induction machines that do not necessitate routing of power lines other than those powering the induction machine.

Another object of the invention is to provide auxiliary device power sources proximal induction machines that do not necessitate routing of power lines other than those powering the induction machine and that also can be modified or otherwise reconfigured to provide different power output levels as may be needed to meet changing future auxiliary device power.

An additional object of the invention, is to provide auxiliary device power sources proximal induction machines that are pre-configured to provide designated power outputs.

These and other objects are achieved in accordance with the present invention by an auxiliary electrical connection box that is coupled to an alternating current (AC) induction machine, such as a medium voltage induction motor power source. The auxiliary connection box may be incorporated in the induction machine's terminal box that receives the machine's power source or it may be a separate auxiliary electrical connection box that is otherwise coupled to the machine's incoming power source, such ganged with an existing terminal box. The auxiliary connection box includes one or more power conversion transformers or bridges that respectively convert the incoming AC power to other AC voltages and/or direct current (DC) useful for operating auxiliary devices proximal the machine. The auxiliary connection box thus avoids need to run power lines to induction machines necessary for operating auxiliary devices separate from the machine's main power source lines. Exemplary auxiliary devices include external auxiliary AC powered cooling fans for medium voltage AC motors. The auxiliary connection box may reconfigurable in the field and/or be pre-configured to provide one or more common auxiliary device output power sources. Common exemplary auxiliary device output power sources include one or more of 110 volt AC, 220 volt. AC, 12 volt. DC and 24 volt. DC power.

The present invention features an induction machine power connection system, for coupling the machine, such as an AC induction motor, to an external electrical distribution power line having a first voltage. The induction machine has a winding. A connection box is coupled to the induction machine, and has therein a first connector coupled to the induction machine winding. The first connector is adapted for coupling to an external electrical distribution power line. A power conversion device is coupled to the first connector, and is adapted for converting power line first voltage to auxiliary power at lower second voltage. An auxiliary connector is coupled to the power conversion device, and is adapted for supplying auxiliary power to auxiliary devices, such as external electric cooling fans.

The present invention also features an induction machine power connection system, for coupling the machine, such as an AC motor, to an alternating current external electrical distribution power line having a first voltage exceeding 1000 volts. The alternating current electric motor has a winding. A connection box is attached to the motor, and includes therein a first connector coupled to the motor winding and the external electrical distribution power line. A power conversion device is coupled to the first connector, adapted for converting the power line first voltage to auxiliary power at a second voltage below 1000 volts. An auxiliary connector is coupled to the power conversion device, and is adapted for supplying auxiliary power to auxiliary devices. An auxiliary device, such as an external electric fan is coupled to the auxiliary connector.

The present invention additionally features an induction machine power connection system, for coupling the machine to an alternating current external electrical distribution power line having a first voltage, exceeding 1000 volts. The machine is an alternating current electric motor having a winding. The system includes a connection box attached to the motor, having therein a first connector coupled to the motor winding and the external electrical distribution power line, a power conversion device coupled to the first connector, adapted for converting the power line first voltage to auxiliary power at a second voltage below 1000 volts, and an auxiliary connector coupled to the power conversion device, adapted for supplying auxiliary power to auxiliary devices. The system also has an auxiliary device coupled to the auxiliary connector. The auxiliary device may be an electric powered cooling fan for cooling the motor.

The objects and features of the present invention may be applied jointly or severally in any combination or sub-combination by those skilled in the art.

BRIEF DESCRIPTION OF THE DRAWINGS

The teachings of the present invention can be readily understood by considering the following detailed description, in conjunction with the accompanying drawings, in which.

To facilitate understanding, identical reference numerals have been used, per possible, to designate identical elements that are common to the figures.

DETAILED DESCRIPTION

After considering the following description, those skilled in the art will clearly realize that the teachings of my invention can be readily utilized in induction machine power connection systems that have to potential to provide multiple types of auxiliary power at a single source point from the line power feeding an induction machine, such as an AC medium voltage electric motor.

General System Overview

Figure 1:
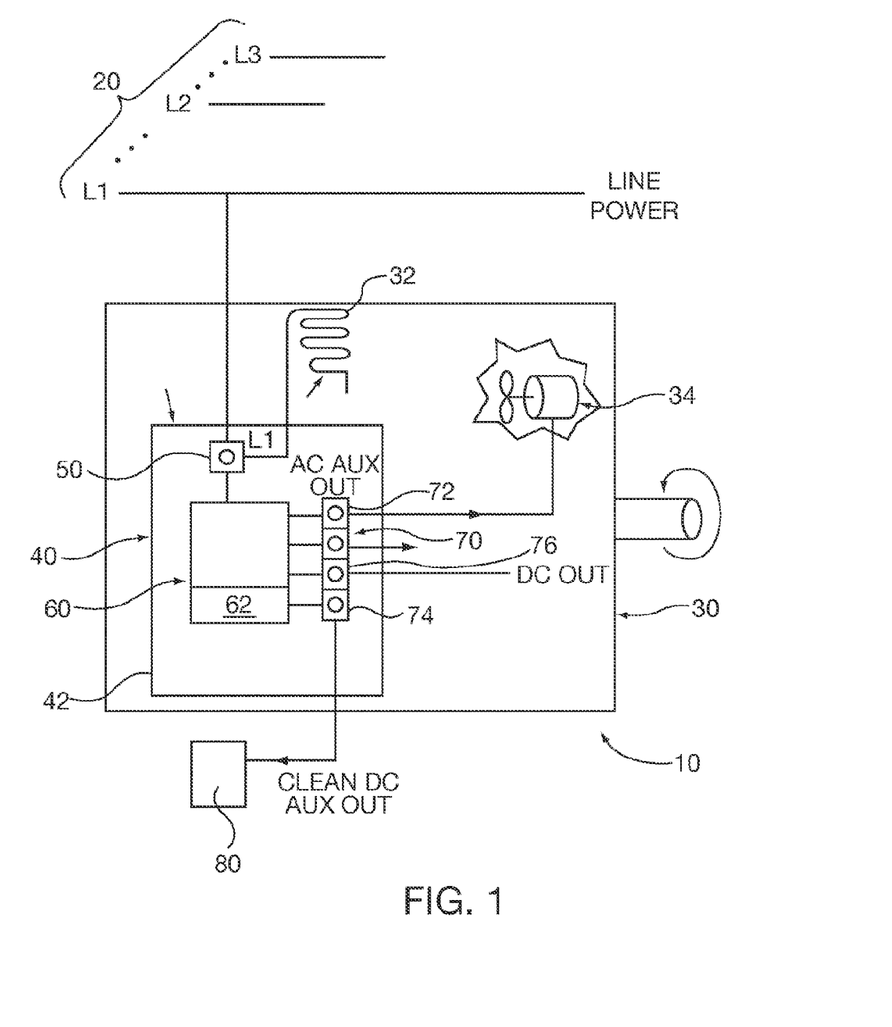
FIG. 1 shows a schematic block diagram of an exemplary embodiment of the induction machine power connection system of the present invention.
Figure 5:
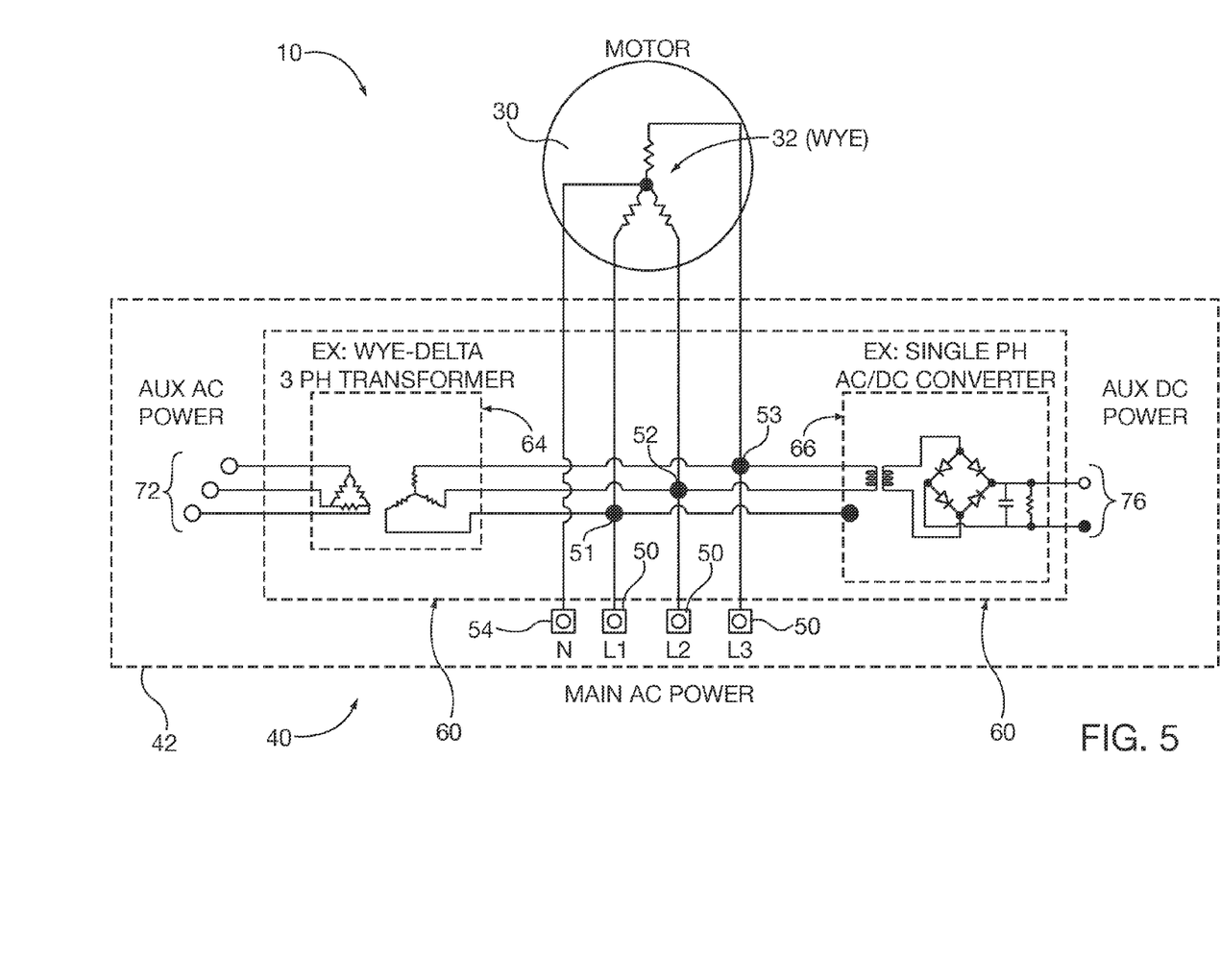
FIG. 5 is a schematic view of the electrical power connections for an exemplary embodiment of the present invention.

FIG. 1 is a schematic block diagram of an exemplary embodiment of the induction, machine power connection system 10 of the present invention that couples an external electrical distribution power line, such as a medium voltage (over 1000 volts and often in the range of 2300 volts to 13,800 volts (13.8 kV)) alternating current (AC) power line 20, to an induction, machine, such as an AC induction motor 30. For simplicity, the figure shows only a single phase of line power 20, but those skilled in the art will appreciate that induction motors are generally powered by three separate power phases, as is shown in FIG. 5. The AC motor 30 has a winding 32, and more particularly three separate stases of windings corresponding to each of the line power 20 phases. In this exemplary embodiment, the motor 30 also has a known auxiliary electric-powered cooling fan 34 for circulating cooling air though the motor housing structure.

The power connection system 10 includes a connection box 40 structure that is coupled directly to or proximal to the motor 30. The connection box 40 includes a housing 42 that houses a known connector 50 that is in turn electrically coupled to a motor winding 32. While a single housing 42 is shown, it should be understood by those skilled in the art that a plurality of interconnected separate sub housings collectively may incorporate all or part of the power connection system 10. In some applications it may be desirable to segregate different components into separate sub housings. The connector 50 is adapted for coupling to a corresponding phase of the external electrical distribution power line 20, so that there is power continuity to energize the motor. Each separate phase of motor winding is coupled to its respective power line phase by a similar separate connector. The connector 50 structure couples the motor 30 to the power line 20 and provides a single power source point for auxiliary equipment, such as cooling fan 34, whether or not all of the power connector system 10 is incorporated in connector box structure 40 that has a single housing 42, as shown in FIG. 1, or a plurality of sub housings. In this way, some or all auxiliary equipment can draw power from the incoming line power 20 without the need to provide separate parallel auxiliary power lines and additional power connection box structures. However, auxiliary equipment often has lower power requirements than provided by the medium voltage power line 20.

In order to satisfy differing power requirements of auxiliary devices, the system 10 includes a known power conversion device 60, that draws power from the connector structure 50 at line power 20 voltage and is adapted for converting the incoming power to auxiliary power at a lower second voltage. Power conversion device 60 may include a known power transformer for converting medium voltage AC power to lower voltage AC power (e.g., 110 V AC, 120 V AC or 220 V AC). Alternatively or concurrently the power conversion device may include a known diode bridge for converting AC line power to DC auxiliary power (e.g., 24 V DC or 12 V DC) suitable for instrumentation, control and communication equipment. Desirably for some applications the power conversion device 60 may be coupled to or include directly known power conditioning devices 62 for filtering or otherwise "cleaning" auxiliary power.

A known auxiliary connector structure 70, such as one or more power lugs or terminal connectors, is coupled to the power conversion device 60, and is adapted for supplying auxiliary power to auxiliary devices, such as external electric cooling fan 34. The power conversion device 60 may be pre-configured to provide a plurality of types of auxiliary output power through different auxiliary power lugs 70, or may be more narrowly configured to meet only the specific auxiliary power needs for a specific application. For example in FIG. 1, auxiliary power lug structure 72 may be supplied with one or more phases of 120 V AC power needed to power the auxiliary cooling fan 34. Concurrently auxiliary power lug structure 74 may be supplied with "clean" 24 V DC power via, the power conditioning device that may be desirable for operation of a power monitoring meter 80. Also, auxiliary power lug structure 76 may be supplied concurrently with 24 V DC power that has not been conditioned by power conditioning device.

Exemplary Auxiliary Cooling Fan Application

Figure 2:
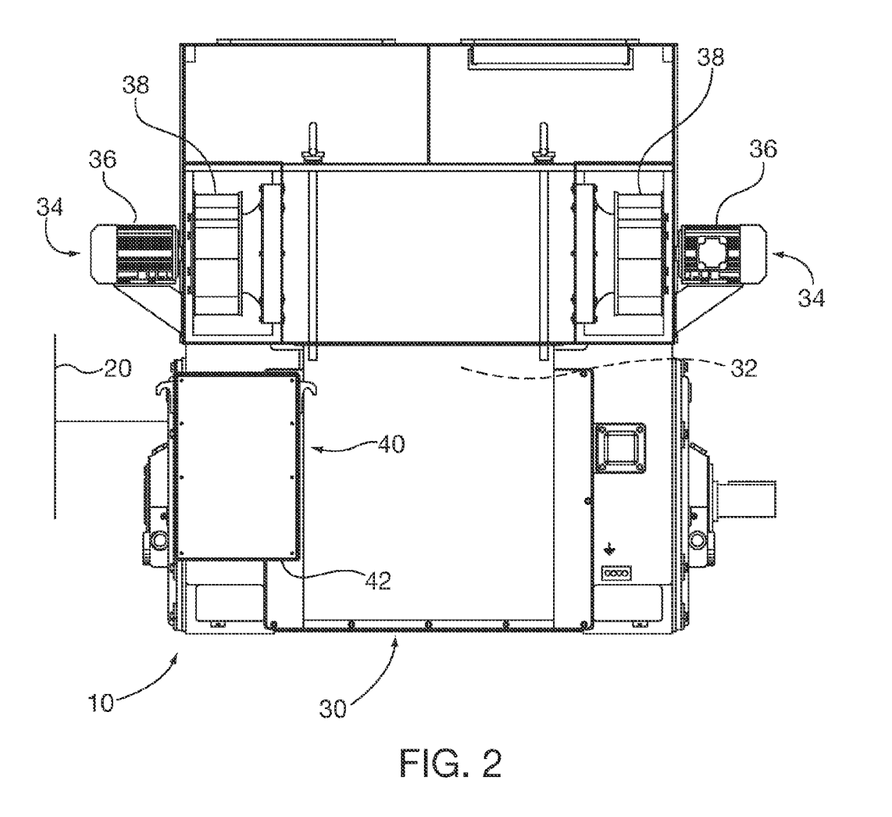
FIG. 2 is a side elevational view of an induction motor incorporating the induction machine power connection system of the present invention.
Figure 3:
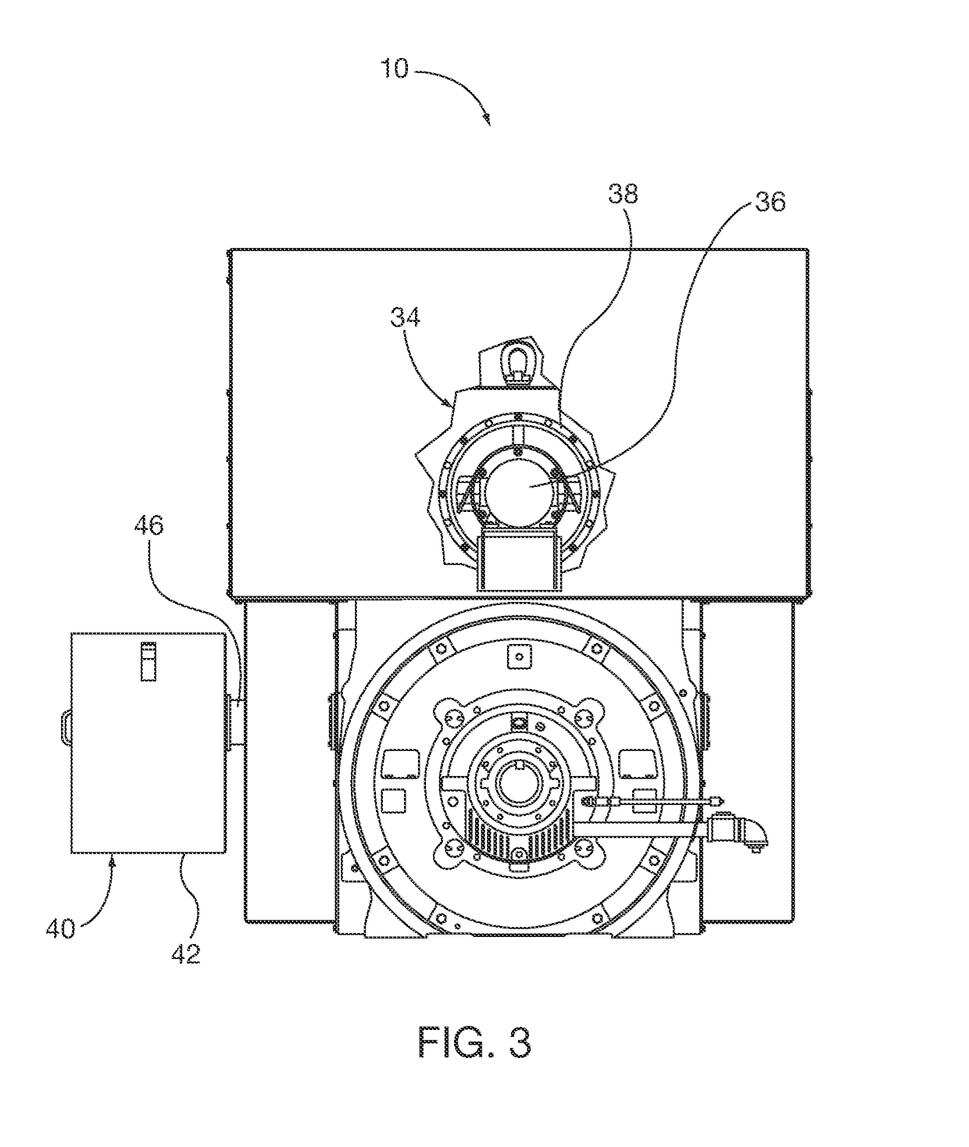
FIG. 3 is a front elevational view of the invention of FIG. 2.

FIGS. 2 and 3 show application of the present power connection system 10 present invention to a medium voltage AC motor 30 having a air of known auxiliary cooling fans 34 that circulate cooling air within, the motor housing structure in known fashion. The fans 34 respectively include a low voltage AC power electric motor 36 spinning centrifugal fan blades 38. Medium voltage line power 20 is routed to connection box 40 in known fashion, where it is coupled to the motor's internal windings 32 and also converted to lower voltage AC power needed for powering the motors 36 of the auxiliary fans 34. The lower voltage AC auxiliary power lines from the connection box 40 to the auxiliary fans 34 are routed through motor 20's shrouding via conduit 46 and are not shown.

Exemplary Connection Box Configuration

Figure 4:
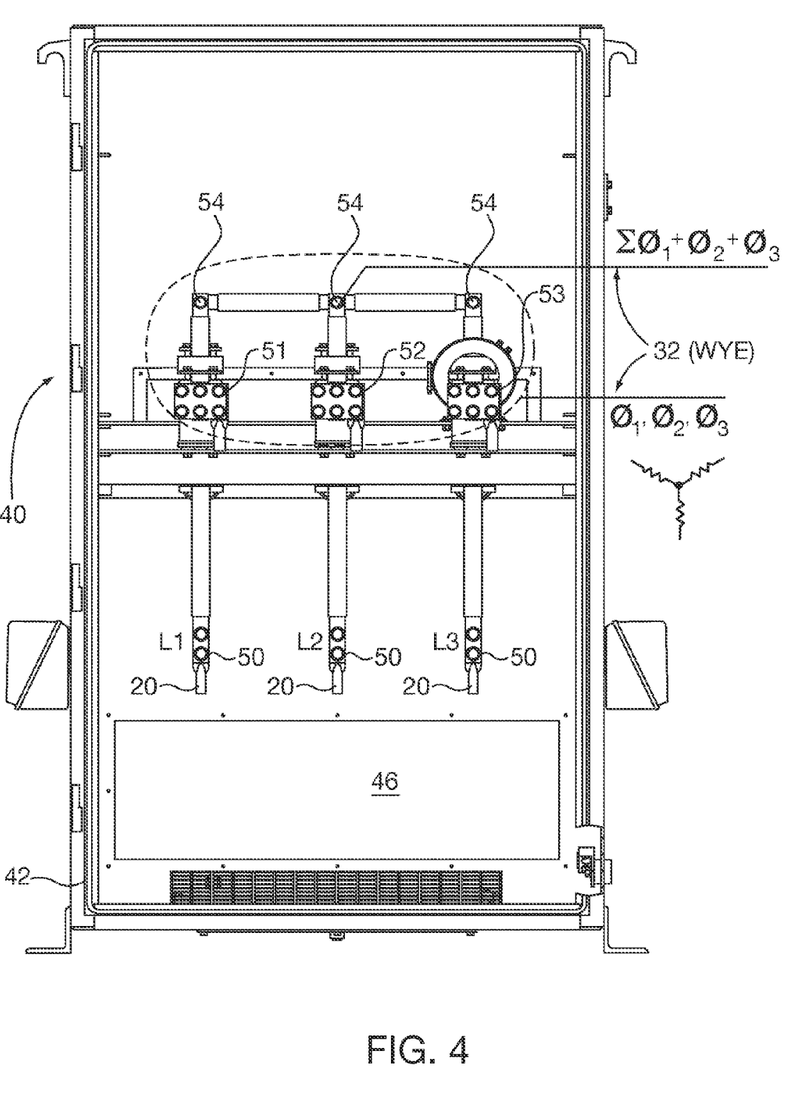
FIG. 4 is a front elevational view of a an exemplary connection box of the present invention.

FIGS. 4 and 5 show interior and wiring details of the exemplary connection box 40 of FIGS. 2 and 3, as well as its internal power busses and lugs that transfer power from the power line 20 to the motor windings 32 and power conversion devices 60. FIGS. 4 and 5 also show the busses and lugs that transfer auxiliary power from the power conversion devices 60 to the auxiliary power output lugs 70. The connection box 40 in this embodiment is an enclosed metal cabinet 42 that includes a known construction blow-out panel 46 in the event that the cabinet interior experiences a rapid, thermally induced pressure surge resulting from a distribution system fault condition.

Referring to FIG. 4, three phases L1, L2 and L3 of line power 20 are separately coupled to respective cable lug connectors 50 that are electrically coupled to respective lugs 51, 52, 53 via elongated busbars. Lugs 51, 52, 52 provide a common connection point for each of the motor's respective phase windings 32 $\Phi 1$, $\Phi 2$, $\Phi 3$ and power conversion devices 60 via lugged power cables (not shown). FIGS. 4 and 5 show an exemplary medium voltage AC motor WYE three phase winding connection, wherein each phase is fed in parallel and share a common return 54 ($\Sigma \Phi 1 + \Phi 2 + \Phi 3$). In the connection box 40 embodiment of FIG. 4, the power conversion devices 60 and any further downstream coupled components reside in one or more additional sub housings of types commonly utilized in the motor industry to house transformers, power converters and the like.

As shown in FIG. 5 the power conversion devices may include a WYE-DELTA three phase transformer 64 for converting medium voltage power from the line 20 phases L1, L2, L3 at the respective lugs 51, 52, 53 to lower 110 V AC auxiliary power that is accessible via auxiliary power lugs 72. Concurrently another power conversion device, single phase AC/DC converter 66, converts the medium voltage power from two of the lugs 52, 53 to auxiliary DC power via auxiliary DC power lugs 76. Auxiliary power drawn from the auxiliary lugs 72, 76 may be passed through power conditioning devices (see 62 in FIG. 1) or other devices known in the art.

Although various embodiments which incorporate the teachings of the present invention have been shown and described in detail herein, those skilled in the art can readily devise many other varied embodiments that still incorporate these teachings.

What is claimed is:

1. An induction machine power connection system for coupling to an external electrical distribution power line comprising:
    an induction machine disposed in a housing having a winding;
    a connection box coupled to the induction machine, having therein a first connector coupled to the induction machine winding, the first connector adapted for coupling the induction machine to the external electrical distribution power line having a first voltage;
    a power conversion device coupled to the first connector, adapted for converting the first voltage of the external electrical distribution power line to an auxiliary power at a second voltage, wherein the second voltage is lower than the first voltage; and
    an auxiliary connector coupled to the power conversion device, adapted for supplying the auxiliary power to one or more auxiliary devices coupled to the auxiliary connector, wherein at least one of the one or more auxiliary devices is an electric powered cooling fan for circulating cooling air through the housing,
    wherein the power conversion device includes an alternating current transformer for converting power line alternating current to auxiliary power alternating current, the electric powered cooling fan including a low voltage alternating current power electric motor.

2. The system of claim 1, wherein the connection box is attached to the induction machine and both the power conversion device and auxiliary connector are inside the connection box.

3. The system of claim 1, wherein the power conversion device is adapted for converting power line alternating current to auxiliary power direct current.

4. An induction machine power connection system for coupling to an external electrical distribution power line having a first voltage comprising:
    an induction machine having a winding, the induction machine disposed in a housing;
    a connection box attached to the induction machine, having therein a first connector coupled to the induction machine winding and the external electrical distribution power line;
    a power conversion device coupled to the first connector, adapted for converting the power line first voltage to an auxiliary power at lower second voltage;
    an auxiliary connector coupled to the power conversion device, adapted for supplying the auxiliary power to one or more auxiliary devices coupled to the auxiliary connector, wherein at least one of the one or more auxiliary devices is an electric powered cooling fan for circulating cooling air through the housing,
    wherein the power conversion device includes an alternating current transformer for converting power line alternating current to auxiliary power alternating current, the electric powered cooling fan including a low voltage alternating current power electric motor.

5. The system of claim 4, wherein the power conversion device and auxiliary connector are inside the connection box.

6. The system of claim 4, wherein the power conversion device is adapted for converting power line alternating current to auxiliary power direct current.

7. The system of claim 4, wherein the power line first voltage exceeds 1000 volts and the auxiliary power is less than 1000 volts.

8. The system of claim 7 wherein the auxiliary power is selected from the group consisting of 110 volt AC, 120 volt AC, 220 volt AC, 12 volt DC and 24 volt DC.

9. The system of claim 4, wherein the induction machine is an electric motor.

10. An induction machine power connection system for coupling to an external electrical distribution power line having a first voltage exceeding 1000 volts comprising:

an alternating current electric motor having a winding, the alternating current electric motor disposed in a housing;

a connection box attached to the alternating current electric motor, having therein:

a first connector coupled to the winding and the external electrical distribution power line;

a power conversion device coupled to the first connector, adapted for converting the power line first voltage to an auxiliary power having a second voltage below 1000 volts; and an auxiliary connector coupled to the power conversion device, adapted for supplying the auxiliary power to one or more auxiliary devices coupled to the auxiliary connector, wherein at least one of the one or more auxiliary devices is an electric powered cooling fan for circulating cooling air through the housing, and wherein the power conversion device includes an alternating current transformer for converting power line alternating current to auxiliary power alternating current, the electric powered cooling fan including a low voltage alternating current power electric motor.

11. The system of claim 10, wherein the power conversion device is adapted for converting power line alternating current to auxiliary power direct current.

* * * * *